Jan. 30, 1951 C. E. RAINWATER 2,539,926

VIDEO COUPLER

Filed June 6, 1947

INVENTOR
Charles E. Rainwater
BY Nicholas Lang Jr.
ATTORNEY

Patented Jan. 30, 1951 2,539,926

UNITED STATES PATENT OFFICE 2,539,926

VIDEO COUPLER

Charles E. Rainwater, Highland Park, Ill., assignor to P. R. Mallory & Co., Inc., Indianapolis, Ind., a corporation of Delaware Application June 6, 1947, Serial No. 753,139

1 Claim. (Cl. 175—359)

This invention relates to a coupling device for use in the video amplifier stages of television receivers and to a circuit utilizing such coupling devices.

In television receivers, the range of frequencies used is considerably greater than in ordinary audio frequency receivers. Thus, in the video amplifier stages of a television receiver, the frequencies used range from 0 to 4 or 4½ megacycles whereas the conventional audio amplifier seldom is required to handle frequencies higher than 20,000 cycles. For this reason, the ordinary coupling devices, such as transformers or resistance-capacitance networks, are not efficient in television receivers since they are not adapted to pass a sufficiently broad range of frequencies. Accordingly, in television receivers, inductive coupling is ordinarily utilized comprising a series peaking coil connected between the plate of the output tube and the control grid of the input tube to improve the response of the amplifier over the highest range of frequencies while a shunt peaking coil is connected between the positive terminal of the power supply and one terminal of the series peaking coil to improve the response at lower frequencies. In this manner, the effective range of the amplifier is considerably broadened and frequencies of up to 4 or even 4½ megacycles may be used.

Previously, the provision of such a network has involved the use of several circuit components which are often quite bulky and extra effort is required to connect them in the proper circuit arrangement. In accordance with the present invention, these difficulties are overcome by winding both coils upon a single form and providing a common terminal between the coils for connection in the amplifier circuit. In accordance with the invention, one of the coils is wound with resistance wire which substantially decreases the "Q" of the coil and thereby broadens the frequency response thereof. In this manner, a single coupling unit is provided of small and compact size which replaces three or more of the components utilized in ordinary circuits. It is an object of the invention to provide a video coupler device for television amplifier circuits.

It is a further object of the invention to disclose a novel circuit embodying the improved video coupler.

It is a still further object of the invention to provide a coupling device embodying two coils upon a common form, one coil being formed from resistance wire to reduce the "Q" thereof and allow the passage of a broad range of frequencies.

It is an additional object to provide a sturdy, compact coupling device which is simple to manufacture, reliable in operation and which replaces several of the circuit components utilized in conventional circuits.

Other objects of the invention will be apparent from the following description and accompanying drawings taken in connection with the appended claim.

The invention accordingly comprises the features of construction, combination of elements, arrangement of parts, and method of manufacture referred to above or which will be brought out and exemplified in the disclosure hereinafter set forth, including the illustrations in the drawings, the scope of the invention being indicated in the appended claim.

For a fuller understanding of the nature and objects of the invention as well as for specific fulfillment thereof, reference should be had to the following detailed description taken in connection with the accompanying drawings, in which.

Figure 1:
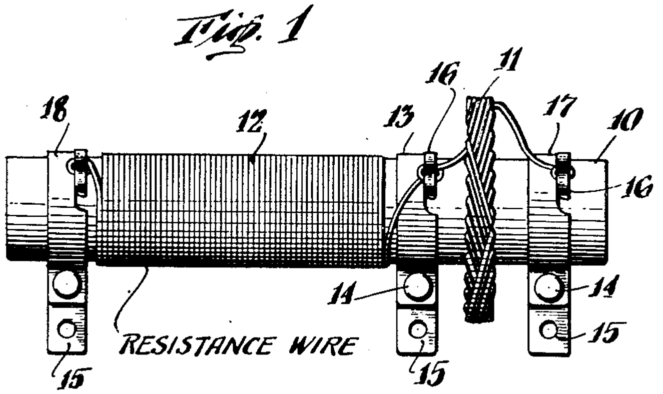
Figure 1 is a plan view of the novel video coupler adapted for use in television circuits.
Figure 2:
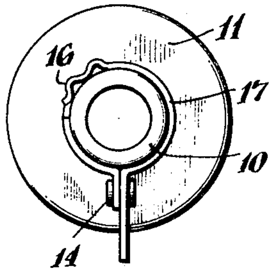
Figure 2 is an end view of the coupling device shown in Figure 1.

While a preferred embodiment of the invention is described herein, it is contemplated that considerable variation may be made in the method of procedure and the construction of parts without departing from the spirit of the invention. In the following description and in the claim, parts will be identified by specific means for convenience, but they are intended to be as generic in their application to similar parts as the art will permit.

Referring now to the drawings in detail, an insulative form 10, preferably of ceramic material and of cylindrical shape, has a first universally wound or series peaking coil 11 and a shunt second helically wound or peaking coil 12 wound thereon. A common terminal member 13 is disposed upon the form 10 between the coils and this terminal consists of a strap of conductive metal, the ends of which are joined by a rivet 14. The terminal further comprises a portion 15 to which a lead or conductor may be attached as by soldering and an ear 16 is struck up from the body of the terminal, this ear having a corrugated spring portion which is adapted to receive the coil leads in clamping engagement. As illustrated, the common terminal member 13 has connected thereto the adjacent ends of the coils 11 and 12 which are soldered or otherwise securely attached to the corrugated portion of the ear 16. Additional terminal members 17 and 18 are provided at the respective ends of the form 10 and these terminals are of generally the same construction as the common terminal member 13. As shown, the free end of the coil 11 is attached to terminal 17 while the free end of coil 12 is attached to the terminal 18 so that the video coupler may be readily connected in circuit by leads or conductors secured to the terminal portions 15.

The shunt peaking coil 12 is formed from resistance wire which is wound in generally helical arrangement upon the cylindrical form 10. Thus, the resistance of the coil is purposely increased thereby substantially lowering the "Q" thereof with resultant broadening of the resonance curve of the coil. The ordinary amplifier gives good frequency response up to about 1 megacycle, after which a rapid declined may be noted, the response being practically nil at frequencies higher than about 1.5 megacycles. In accordance with the invention, the shunt peaking coil 12 has its resonant frequency at about 2.0 megacycles but, due to the low "Q" thereof, the coil improves the frequency response of the amplifier over a broad range extending from about 1.0 to 4.0 megacycles. Accordingly, the use of the shunt peaking coil 12 alone in combination with an uncompensated amplifier provides a substantially uniform frequency response up to about 2.0 megacycles which drops off gradually up to frequencies of about 4.5 megacycles. The series peaking coil has a relatively sharp resonance point at about 3.5 megacycles and thus improves the frequency response at the extreme high frequency end of the video frequency band. The use of both coils in the amplifier circuit results in substantially uniform frequency response up to as high as 4.5 megacycles which is adequate to cover the desired band of frequencies.

Figure 3:
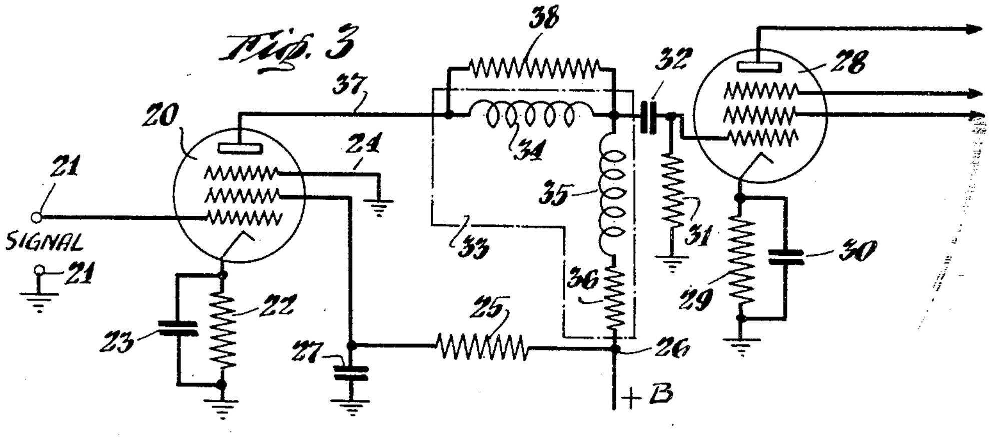
Figures 3 and 4 are schematic diagrams of video amplifier circuits utilizing the novel coupling device.

In Figure 3, a circuit is shown embodying the novel video coupler disclosed by Figure 1. This circuit includes a pentode 20 upon the control grid of which a video frequency signal is impressed through the terminals 21, the circuit including a conventional bias resistor 22 which is shunted by a condenser 23. As will be understood by those skilled in the art, the suppressor grid is grounded by a conductor 24 while the screen grid is connected through a voltage dropping resistor 25 to the positive terminal 26 of the power supply, the screen grid also being connected to a grounded bypass condenser 27. An amplified video frequency signal appears in the plate circuit of the pentode 20 and, in accordance with the invention, this plate circuit is coupled to the control grid of a second pentode 28 which functions as a video amplifier tube. Alternatively, the tube 28 may be a cathode ray picture tube where the pentode 20 is in the last video amplifier stage. The pentode 28 is also provided with a bias resistor 29 shunted by a condenser 30 and a grounded grid leak resistor 31 is connected to the control grid thereof.

The coupling means between the plate circuit of pentode 20 and the control grid of tube 28 includes the novel video coupler and a coupling condenser 32 which is connected to the control grid of pentode 28. In the circuit diagram, the video coupler is represented by the dotted portion 33 of the diagram, the series peaking coil 11 corresponding to the inductor 34 while the shunt peaking coil 12 is represented by an inductor 35 connected in series with a resistance 36. The common terminal of the video coupler is connected through the coupling condenser 32 to the control grid of pentode 28 while the other terminal of the series peaking coil 34 is connected to the plate of pentode 20 by a lead 37. The shunt peaking coil 35, 36 is connected to one end thereof to the common terminal and at the other end thereof to the positive terminal 26 of the power supply.

When utilizing the novel video coupler in the manner shown, frequencies of up to 4½ megacycles appearing in the plate circuit of pentode 20 are accurately transferred to the control grid of pentode 28, the shunt peaking coil 35, 36 improving the frequency response over a broad range on either side of the resonant frequency of 2 megacycles and the series peaking coil increasing the frequency response over a relatively narrow range in the region of 4 megacycles, thereby providing a substantially uniform response over the entire range of up to about 4.5 megacycles. It will be noted that the resistance 36 which is purposely introduced into the shunt peaking coil 35 substantially reduces the "Q" thereof whereby some improvement in frequency response is obtained over the range of about 1 megacycle to 4.5 megacycles. This resistance also serves as a load resistor rather than a dropping resistor to reduce the voltage applied to the plate of pentode 20 to the desired value. In some cases, it may be desirable to provide a resistor 38 connected in shunt across the terminals of the series peaking coil to somewhat flatten the frequency response thereof.

Figure 4:
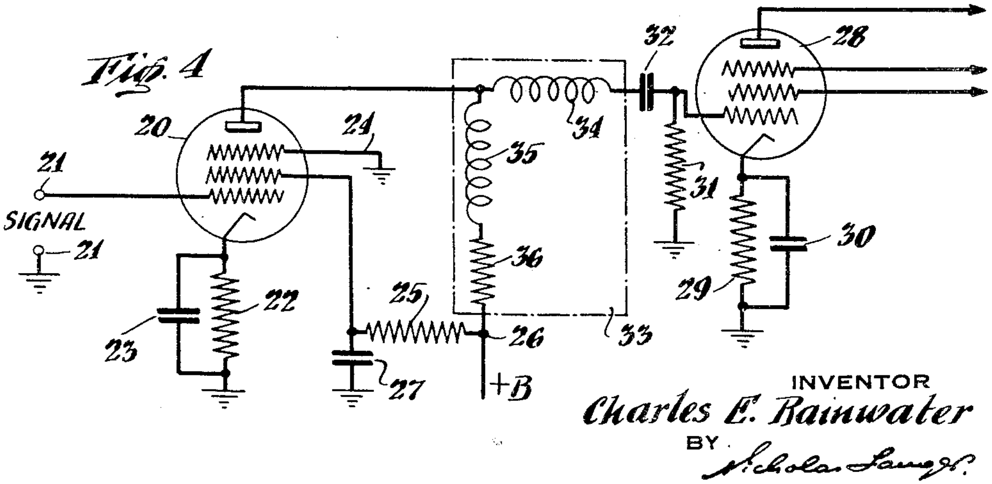

An alternate coupling circuit is illustrated in Figure 4, in which parts similar to those already described are indicated by like reference numerals. In this case, the common terminal of the video coupler is connected to the plate of pentode 20 while the other terminal of series peaking coil 24 is connected through the coupling condenser 32 to control grid of pentode 38. In this case also, the other terminal of the shunt peaking coil is connected to the positive terminal 26 of the power supply. This circuit functions in generally the same manner as the circuit shown in Figure 3 and provides a substantially uniform frequency response up to about 4.5 megacycles.

While the present invention, as to its objects and advantages, has been described herein as carried out in specific embodiments thereof, it is not desired to be limited thereby but it is intended to cover the invention broadly within the spirit and scope of the appended claim. Thus, for example, it is specifically contemplated that the use of the novel coupling device is not confined to video amplifier stages of television receivers but extends also to wide band amplifiers used in cathode ray oscilloscopes and for other purposes.

What is claimed as new and desired to be secured by Letters Patent is:

A high frequency coupler for a video amplifier stage comprising a short cylindrical form of insulative material, a first coil having a universally wound configuration positioned at one end of said form, a second helical coil wound of high resistivity wire to obtain a predetermined "Q" characteristic positioned adjacent said universally wound coil and extending along said form for substantially more than half thereof, said two coils being connected at individual ends thereof to a common terminal positioned therebetween, and a plurality of terminals individually connected to said other ends of said two coils, all of said terminals having integrally connected solder lugs joined thereto whereby an extremely compact coupling means is effected for extremely high frequencies at a minimum of space and having exceedingly uniform characteristics.

CHARLES E. RAINWATER.

REFERENCES CITED

The following references are of record in the file of this patent:

UNITED STATES PATENTS

| Number | Name | Date |
|---|---|---|
| Re. 21,176 | Wheeler | Aug. 15, 1939 |
| 1,445,919 | Stone | Feb. 20, 1923 |
| 1,490,041 | Sterns | Apr. 8, 1924 |
| 1,575,552 | Dow | Mar. 2, 1926 |
| 1,975,620 | Saul | Oct. 2, 1934 |
| 1,973,037 | Beers | Sept. 11, 1934 |
| 2,254,214 | Gage | Sept. 2, 1941 |
| 2,319,594 | Gage | May 18, 1943 |
| 2,370,399 | Goodale | Feb. 27, 1945 |

OTHER REFERENCES

Fink: Principles of Television Engineering, McGraw-Hill Book Co., 1940, page 228.